JESSE NICHOLSON.
Improvement in Detachable Draught Hooks.
No. 121,464.            Patented Dec. 5, 1871.
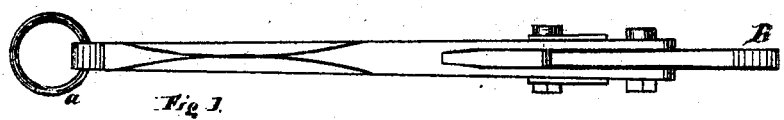
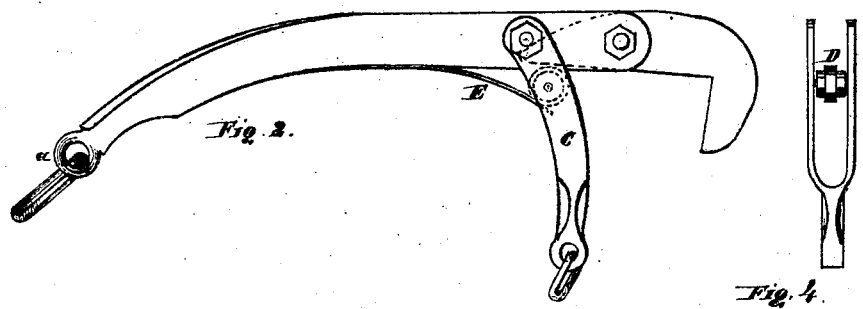
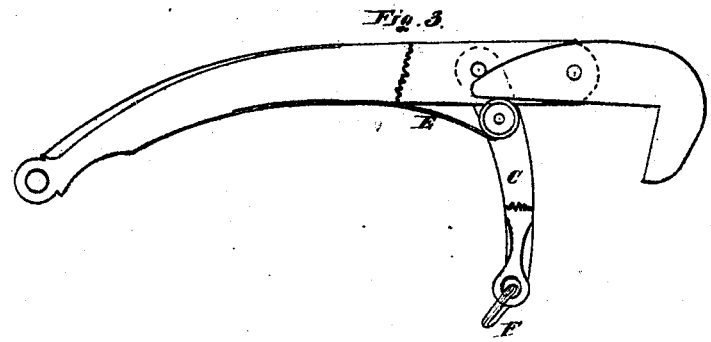

121,464

UNITED STATES PATENT OFFICE.

JESSE NICHOLSON, OF MONTICELLO, INDIANA.

IMPROVEMENT IN DETACHABLE DRAFT-HOOKS.

Specification forming part of Letters Patent No. 121,464, dated December 5, 1871.

*To all whom it may concern:*

Be it known that I, JESSE NICHOLSON, of Monticello, in the county of White and State of Indiana, have invented certain new and useful Improvements in Detachable Draft-Hooks, of which the following is a specification, reference being had to the accompanying drawing which forms a part hereof.

My invention relates to such hooks as are usually employed in connection with drafting devices, such as coal-elevators, for example; and it consists in a novel construction and arrangement of the several parts of the said hook, the object of my invention being to furnish a hook which may be conveniently detached from the part to which it may be hooked by means of and during the operation of the mechanism with which it may be employed, or operated directly or indirectly by the hand of an operator, so as to cause the coal, &c., to be drawn or elevated to any desired distance and there stopped, in the manner described, as will hereafter more fully appear.

Figure 1 represents a top or plan view of my improved hook. Fig. 2 represents a side elevation of the same. Fig. 3 represents a side elevation of the same, with a part of the hook-frame and friction-roller frame removed so as to show the form of the hook and friction-roller and their position relative to each other; and Fig. 4 represents a top or plan view of the friction-roller frame with the friction-roller therein.

A represents the hook-frame or the plate to which the hook is attached. This frame or plate is furnished with a ring passing freely through it at one end, as at *a*, for the purpose of conveniently attaching any rope or cable to it. B is a hook attached to the slotted end of the frame or plate A by means of a bolt and nuts or other convenient method, and so as to turn freely about the said bolt, as shown at *b*. C is a forked or slotted frame or arm attached to the frame or plate A by means of a bolt and nut or other similar method, as shown at *c*. D is a friction-roller pivoted in the slotted frame or arm C, as shown at *d*. E is a spring attached to the frame or plate A, and resting against the friction-roller D, as shown. F is a link or ring attached to the free end of the frame or arm C for the purpose of conveniently attaching any rope or cable thereto. The rear end of the hook B rests upon the friction-roller D, which latter is held in such a position as to support said hook by means of the spring E, while the bolt *c* prevents the hook B from being pressed upward farther than the said bolt, and the hook is thereby firmly held in the position shown in Figs. 2 and 3, whether the hook be in use or not. When it is desired to unfasten the hook the free end of the arm C is pulled or pushed backward in any desirable manner until the rear end of the hook is released by the friction-roller, when a pressure or strain against the inner face of the hook will throw the point of the hook upward and release it from the part to which it may be hooked. In order to accomplish this result when the said hook is used in connection with devices like those mentioned, the draft-chain is attached to the ring or frame at *a*, and the hook is hooked to the engine or other forward moving apparatus, which elevates the coal-box, for example, and one end of a cord is attached to the link F or directly to the lower end of the arm C. The cord attached to the arm C may have its other end attached to any fixed object, and its length may be such as to tighten and pull on the arm C, and thus unclasp the hook at the proper time; or this cord may be operated by the hand of a workman.

The use of the spring E may be dispensed with; but its use is recommended as being serviceable in assisting to hold the arm C in its proper place.

The upper rear end of the hook B is rounded or inclined, so that, in working devices, the weight of its forward end will cause it to resume the position shown in Figs. 1 and 2 when its point is turned downward, as there represented.

Having described the construction and operation of my invention, what I claim and desire to secure by Letters Patent, is—

1. A detachable hook, when constructed and operating substantially in the manner described.

2. In combination with the frame or plate A, the hook B, arm or frame C, and roller D, when operating substantially as and for the purpose specified.

JESSE NICHOLSON.

Witnesses:
FRANCIS F. WARNER,
H. F. BRUNS.